Figure 1:
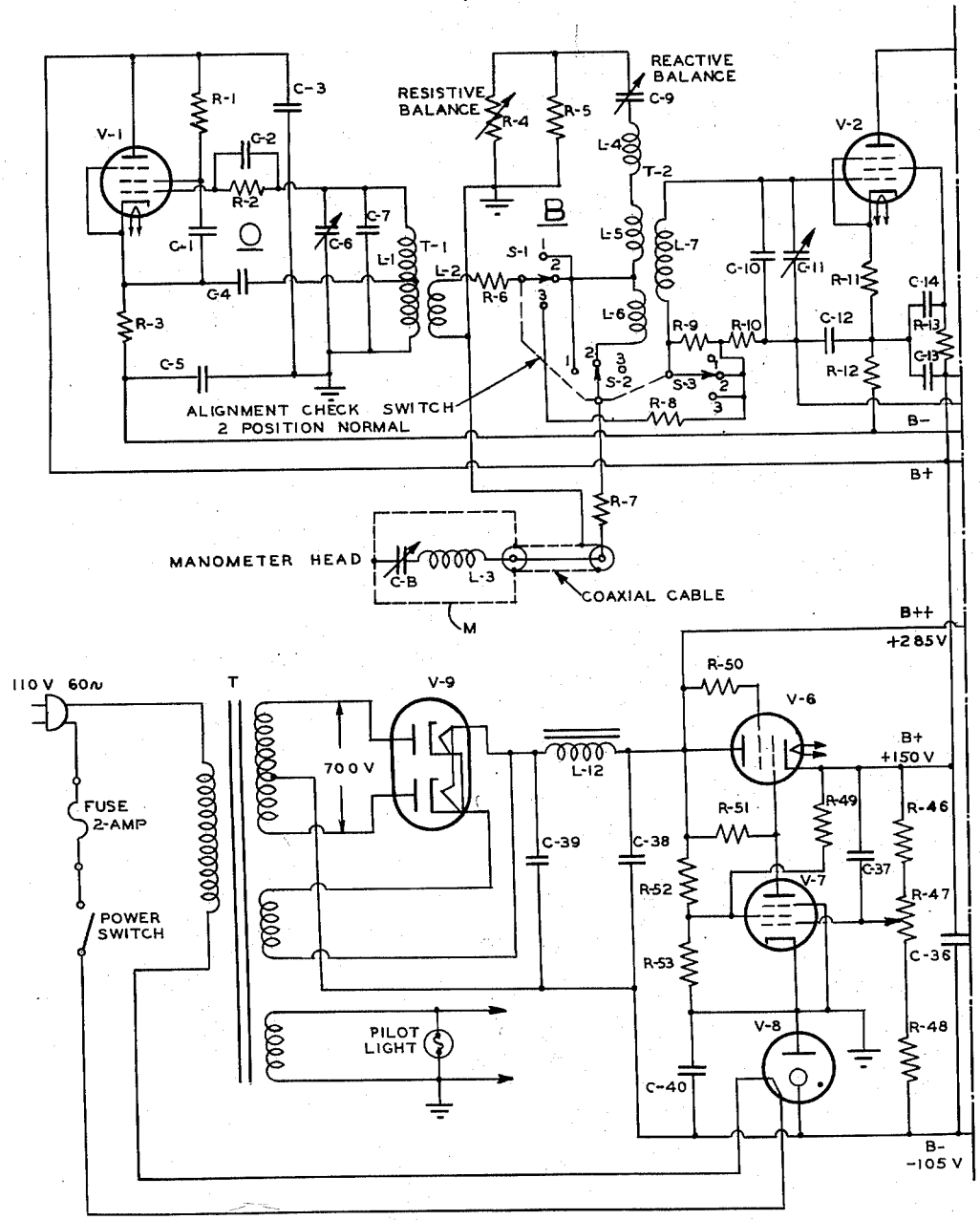

Feb. 3, 1953

H. E. TOMPKINS 2,627,539

ELECTRICAL SYSTEM

Filed Nov. 23, 1948

2 SHEETS—SHEET 1

INVENTOR
HOWARD E. TOMPKINS
BY HIS ATTORNEYS
Howson & Howson

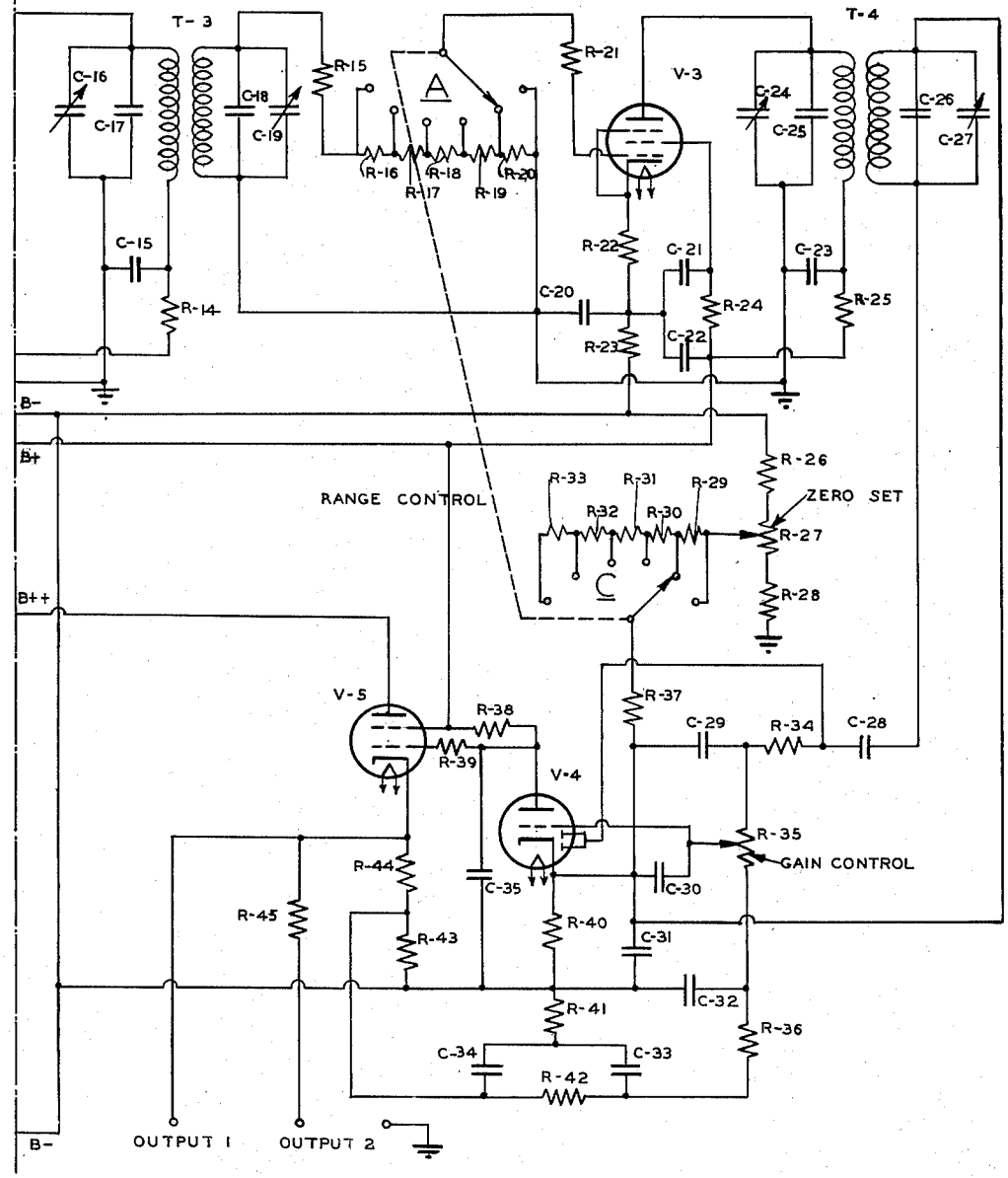

Patented Feb. 3, 1953

2,627,539

UNITED STATES PATENT OFFICE 2,627,539

ELECTRICAL SYSTEM

Howard E. Tompkins, Ridley Park, Pa., assignor to Trustees of the University of Pennsylvania, Philadelphia, Pa., a corporation of Pennsylvania Application November 23, 1948, Serial No. 61,680

6 Claims. (Cl. 175—183)

This invention relates to electrical systems for producing an output voltage which is representative of some variable condition. In its broader aspect, the invention relates generally to such a system regardless of the nature of the variable condition to which the system responds.

The principal object of the invention is to provide an improved system of the general type above-mentioned.

In its narrower aspect, the invention relates particularly to a system which responds to variations of a pressure condition. In this latter aspect, the invention is directed particularly to the recording or indication of blood pressure variations.

Blood pressure recording and indicating systems of the type employing a manometer head are now well known. Such systems, however, as heretofore constituted, have not been entirely satisfactory. Generally speaking, they have been too unstable and difficult to adjust when they have had adequate sensitivity.

Another object of the present invention is to provide an improved system for producing a continuous accurate indication or record of blood pressure changes.

A further object of the invention is to provide a system of this character which has great stability and which is capable of easy use.

A still further object of the invention is to provide such a system embodying means for readily checking and aligning the circuits thereof.

Other objects and features of the invention will be apparent from the following detailed description.

Since the invention is particularly concerned with blood pressure recording and indicating systems, it will be described in its specific application to such a system. However, it will be understood that the novel features of the invention are applicable more broadly to systems of the general type of which the illustrated embodiment is representative.

In the accompanying drawings, Figures 1 and 2 cooperatively illustrate in diagrammatic form an actual physical embodiment of the invention. The two drawing sheets are intended to be placed side by side with Figure 1 at the left, and when thus placed they disclose the complete system.

The illustrated system is of the type in which a high frequency of R. F. signal is modulated by the variations to be measured, the modulated R. F. signal is amplified and detected, and the modulation component thus obtained is amplified to a power level sufficient to drive a recorder, such as an ink-writing galvanometer. The modulation of the R. F. signal is effected through the medium of an R. F. bridge. The use of R. F. amplification provides the necessary gain with great stability.

Referring generally to the illustrated system, an R. F. oscillator O, preferably operated at a frequency of between 1 and 5 mc., supplies an R. F. signal to a bridge B, one arm of which includes a manometer head M. Variations of the head capacitor C-8 cause variations in the R. F. signal which appears at the output of the bridge. Such signal is amplified in R. F. amplifier stages V-2 and V-3, and is detected in the diode section of tube V-4. The modulation component thus derived is amplified in the triode section of V-4 and in the output amplifier stage V-5. The output voltage appears at outputs 1 and 2. The output voltage is supplied to an ink-writing galvanometer (not shown), such as the Brush model BL-201 ink-writer, or to some other indicator such as a cathode-ray-oscillograph.

An alignment check switch is provided in association with the bridge B. An attenuator A, with a ganged compensator C, is provided in the R. F. amplifier. The purposes and functions of these devices will be described later.

The operating voltages for the various tubes are supplied by the power supply shown at the bottom of Figure 1. It should be noted that in this system, B— is 105 volts below chassis or ground, and B+ is regulated at 150 volts above chassis or ground. This arrangement provides the proper D. C. component in the output and it also provides added stability for the R. F. circuits.

Referring more particularly to the various components of the system, the manometer head M comprises an inductance coil L-3 and a variable capacitor C-8, the latter element having its capacitance varied by blood pressure changes as well understood by those skilled in the art. The manometer head may be of the type described by Lilly, Legallais and Sherry (Journal of Applied Physics—July 1947). The manometer head constitutes part of the impedance bridge B, as above mentioned and as described in greater detail hereinafter.

The oscillator O is a modified Hartley oscillator comprising a vacuum tube V-1, a tank circuit L-1, C-6, C-7, and the associated capacitance and resistance elements as shown. The variable capacitor C-6 provides the necessary adjustment to set the oscillator at the frequency of the manometer head. The plate of tube V-1 is grounded for R. F. through C-3. The cathode of the tube V-1 is tapped about one-fourth of the way up the tank coil L-1 through C-4. C-4 isolates the cathode from the chassis (ground) for D. C. The D. C. return for the cathode is through R-3 to B—. The control grid of tube V-1 is connected through R-2 and C-2 to the top or ungrounded end of the tank circuit, and is thus at chassis potential minus whatever grid leak bias is developed. This circuit arrangement sets the cathode of V-1 approximately at chassis (ground) potential, and maintains the average plate current of the tube quite constant. In effect, R-3 in the cathode circuit provides D. C. degeneration, and maintains the operating point of the tube. The screen of V-1 is connected through a resistor R-1 to B+. C-1 serves as a by-pass between screen and cathode, thus reducing the effect of varying loads in the plate circuit of the tube.

The output of the oscillator O is supplied to the impedance bridge B through the secondary L-2 inductively associated with L-1. The impedance bridge comprises two arms, one including elements L-4, C-9 and parallel resistors R-4, R-5, and the other arm of the bridge including resistor R-7 and the elements L-3, C-8 of the manometer head. The oscillator output is applied to the bridge through R-6 which is an isolating resistor to protect the oscillator from variations in load, and to present a constant impedance to the bridge. An alignment check switch, comprising ganged switches S-1, S-2, and S-3, is associated with the bridge for purposes presently to be described. This switch has three positions designated respectively 1, 2 and 3. Position 2 is the normal operating position in which the bridge is completed, as will be apparent from inspection. Assuming that the switch is in position 2, signal is fed from the oscillator to the junction of coils L-5 and L-6, which are similar coils accurately balanced with respect to the associated secondary coil L-7. Thus, when equal currents flow in L-5 and L-6 in opposite directions there is zero voltage induced in L-7.

When both arms of the bridge are tuned to the same frequency and in addition the total input resistances to the two arms are equal, the bridge is balanced, equal currents flow in L-5 and L-6, and the output voltage across L-7 is zero. If C-9 is approximately equal to C-8, this balance obtains over a wide range of frequencies, so that the frequency of the oscillator is not critical. In practice, the oscillator frequency is adjusted to the resonant frequency of the two tuned arms at balance so that the impedance level in the coaxial cable connecting R-7 with L-3 may be as low as possible, thus reducing the effect of capacitance variations in the cable.

The resistor R-7 is introduced into the manometer head arm of the bridge to increase the linearity. However, this resistor tends to reduce the sensitivity, and in instances where the capacitance of C-8 does not vary over a wide range, R-7 may be reduced in value or eliminated entirely. Alternatively, the Q of L-3 could be reduced. The effective Q of L-3, C-8 and R-7 in one physical embodiment of the system was about 25.

Bridge balance is accomplished by alternately tuning C-9 and R-4 for minimum output. Setting the alignment check switch to position 1 allows the oscillator to be tuned to bridge resonant frequency, as L-6 is thereby removed from the circuit, and the grid circuit resonance of L-7 with C-10, C-11 is damped heavily by resistor R-9. It will be apparent that adjustment of the switch from position 2 to position 1 removes a short circuit from about the resistor R-9, thus causing said resistor to be included in the grid circuit of the R. F. amplifier V-2. With the switch in position 1, the oscillator is tuned for maximum output, thus setting it on bridge frequency.

In the normal operating position of the switch, i. e., position 2, the grid circuit of V-2 is resonant, with the necessary damping provided by R-10. The band width of this tuned circuit must be sufficient so that normal drift during long use will not reduce the gain due to mistuning, or change the bridge sensitivity due to a variation in the impedance reflected into the bridge. A Q of 35 is satisfactory for this circuit.

After the oscillator is adjusted, the check switch is returned to position 2, C-9 is decreased slightly to give some bridge output, and C-11 is adjusted for maximum output. This aligns the grid circuit of V-2. The final step in bridge alignment will be discussed later in connection with the zero adjustment.

Position 3 of the alignment check switch allows the oscillator signal to feed around the bridge through R-8, and to be developed across R-10. In this position, the resistor R-6 is connected through R-8 to the junction of R-9 and R-10, and R-9 is short circuited. This switch position is provided so that the circuit may be tested and aligned (except for the bridge balance alignment) when no manometer head is available. It should be realized that in switch position 2, if the manometer head is disconnected from the circuit, the R. F. amplifier is overloaded.

The R. F. amplifier stages, comprising vacuum tubes V-2 and V-3, are identical stages operating at the oscillator frequency, with transformers T-3 and T-4 both providing critical coupling, each tuned circuit preferably having a Q of the order of 50. In each stage, both degenerative R. F. feedback and D. C. degeneration are provided to stabilize the gain and the operating point. Resistors R-11 and R-22 provide the R. F. inverse feedback, while resistors R-12 and R-23 in conjunction with R-11 and R-22 set the plate currents of the tubes and provide the D. C. degeneration. In each stage, the grid return is to chassis or ground, whereas R-11, R-12 and R-22, R23 return to the cathodes to B—, i. e. —105 volts. As the operating bias of the tubes is very small, being of the order of one and one-half volts, the plate current is essentially 105 divided by the sum of R-11 and R-12 (or R-22 and R-23), and is largely independent of tube characteristics and plate and screen voltages.

The capacitors C-12 and C-26 provide by-pass paths between the respective cathode circuits and chassis or ground. Resistors R-13 and R-14 and capacitors C-13, C-14 and C-15 serve to filter and by-pass the screen and plate return circuits of V-2 to the cathode circuit and chassis. The resistance and capacitance elements R-24, R-25, R-26, C-27 and C-28 cooperatively perform the same functions in association with the second R. F. amplifier, V-3. It is possible to by-pass the screens of the amplifier tubes directly to the chassis, but the arrangement shown was chosen to avoid feedback. It was deemed desirable to return the plate tank tuning condensers C-16 and C-29 to chassis rather than B+, so as to avoid the possibility of electric shock while aligning the amplifier.

Resistors R-15 through R-21 form an attenuator A having five ranges differing in steps of about 1.8 to 1 in sensitivity, with a sixth position for zero output. Resistor R-15 prevents detuning of the secondary of transformer T-3, while resistor R-21 prevents undue loading of the attenuator by the grid of tube V-3. Equal attenuator performance can be obtained by using a capacitance compensated attenuator, as was done in one embodiment of the device.

A zero compensation device C is ganged to the attenuator. The purpose and operation of this compensation device will be described later.

The signal output from the secondary of transformer T-4 is fed through C-28 to the diode section of tube V-4, and is thus detected. Elements R-34 and C-29 filter out the R. F. component of the signal, and part of the remaining detected or envelope signal is fed to the grid of the voltage amplifier triode of V-4 through gain control R-35. Capacitor C-30 serves to by-pass R. F. from grid to cathode, while capacitor C-31 serves to by-pass R. F. from cathode to B—.

The lower end of gain control R-35 is returned through R-36 and R-42, whose function will be described later, to a point in the output circuit, which provides considerable inverse feedback around the output amplifier comprising tube V-5 and the triode section of V-4.

The resultant signal on the grid of tube V-4 consists of a voltage directly proportional to the blood pressure being measured. This voltage has a D. C. component and alternating components which, in the light of present practice, are considered to extend up to 100 cycles per second. The band width of the fluid system at the manometer head limits the overall response to this as does the response of the recording galvanometer (not shown) normally used with the system.

The above-mentioned signal is amplified by the triode section of V-4 and is developed across the plate load resistor R-38. The capacitor C-35 serves as an R. F. by-pass, and resistor R-39 is a grid current limiting resistance which prevents the grid of V-5 from going positive, thus limiting the voltage excursion at the output and protecting the indicating instrument at one end of its range, Cut-off of tube V-5 protects the instrument at the other end of its range.

The output tube V-5 is utilized as a cathode follower power amplifier. The output is taken between its cathode and chassis or ground, but it will be noted that the cathode return is through R-44 and R-43 to B—, 105 volts below chassis. Zero blood pressure position is normally of the order of —23 volts, i. e., 23 volts negative with respect to chassis, and full scale is +23 volts with respect to chassis. This system makes full use of a galvanometer type instrument whose rest position is mid-scale, such as the Brush in-writer. Tube V-5 will give this ±23 volt swing into a load of 1500 ohms or higher resistance at output 1. Output 2 is provided with a series of 1500 ohm resistor R-45, so that a low resistance mirror galvanometer may be used if desired. Any impedance load may be used at output 2 but only loads of 1500 ohms or higher should be used at output 1.

A fraction of the output voltage, determined by R-43 and R-44, is applied through R-42 and R-36 as inverse feedback, thus stabilizing the gain and improving the linearity. The feedback factor varies with the gain control but is at least of the order of 5.

Elements R-42, C-33, C-34 and R-41 comprise a selective bridged-T network to reduce the feedback in the vicinity of 100 cycles per second, thus compensating for the falling high-frequency characteristic of the Brush ink-writing galvanometer. Resistor R-36 controls the amount of feedback, and limits the minimum gain to one-half the maximum gain on each range. The gain control is normally operated at its center, and is varied above and below normal to obtain sensitivities intermediate between those available from range switch A.

A small potential is developed across R-40 from V-4, but most of the current through R-40 comes from the zero set controls. Any potential appearing across R-40, between cathode and B—, is, of course, amplified in the output amplifier and is subjected to the inverse feedback action.

The zero-set potential is determined by a manual control R-27 and associated fixed resistors R-26, R-28 and R-37, in conjunction with R-40 and the compensating resistors R-29 through R-33. It will be clear from the following discussion why the zero would shift from range to range if a compensating circuit were not included in the system.

The R. F. bridge B is normally operated slightly off balance to allow for the measurement of pressure slightly below atmospheric and to reduce the danger of non-linearity at low pressures due to drift in the resistance balance of the bridge. This means that at zero pressure (i. e. atmospheric pressure) at the manometer head, a certain definite R. F. potential appears at the grid of tube V-2, and is amplified and transmitted to the attenuator A. If the attenuator is at zero no signal appears at the detector V-4, but if the attenuator is on the 5th range for maximum sensitivity, a voltage equivalent to nearly full scale appears at V-4. The compensating resistors R-29 through R-33 introduce enough compensating direct voltage into the cathode circuit of tube V-4 to return the net signal applied to V-4 to zero, so that the indicated output remains constant as the range switch of the attenuator A is adjusted from one range to another.

If now the bridge is unbalanced further, the compensation is no longer correct, and the zero shifts as the range switch is rotated. This is a convenient indication of correct bridge unbalance, and the final step in aligning the R. F. bridge is to adjust capacitor C-9 so that the output remains constant at the bottom of the scale when the range switch is rotated, and of course, the manometer head is open to atmospheric pressure.

If in the course of operating the instrument this adjustment changes, and a pronounced zero shift occurs, it is an indication either that the manometer head is not returning to its original capacitance when it should, or that the electrical alignment has shifted.

Mechanical shift in the head is much more probable at the present state of the art, as existing heads are somewhat temperature sensitive. In view of this, it may be desirable to provide a small trimmer condenser, of the order of 1 to 1.5 micromicrofarads, in parallel with C-9, to enable easy adjustment in correspondence to the momentary "zero" capacitance of the head. In such case, it may be more convenient to connect C-9 and the trimmer condenser to ground, and to insert R-4 and R-5 in the circuit between L-4 and L-5, rather than between C-9 and ground.

From the foregoing discussion, it will be seen that the amount of unbalance at "zero" is thus determined by compensating resistor R-27 in relation to resistors R-29 through R-33. If greater unbalance is desired at "zero," R-27 should be increased, while if less unbalance is desired, R-27 should be decreased.

Referring now to the power supply, this provides regulated B+ and B− (+150 and −105) and unregulated B++ for the plate of the output tube V-5. It has been found unnecessary to regulate the plate voltage of beam tetrode V-5, as its current is determined largely by the screen voltage, which is regulated.

The power supply is electronically regulated, and contains a number of features not usually found in such circuits. The power transformer T and rectifier V-9 combination is conventional or standard, except that B− is isolated from the chassis or ground. Capacitors C-39 and C-38, and the associated choke L-12, form a conventional pi-section filter. C-38 and C-39 should be filter condensers whose outer can or container is not connected to the capacitor proper.

Tube V-6 is the series tube through which all of the regulated current is drawn. Resistor R-50 isolates the screen and plate of this tube, and reduces any tendency toward oscillation.

Tube V-7 is the regulator amplifier tube, whose grid is driven by B+ through voltage divider R-46, R-47, R-48 and capacitor C-37. Potentiometer R-47 sets the value of B+. Capacitor C-37 increases the feedback at high frequencies, thus reducing whatever hum remains in the output and stabilizing the circuit against oscillation. The cathode of V-7 is held at constant potential with respect to B− by the voltage regulator tube V-8. The capacitor C-40 serves as a by-pass for V-8, preventing the circuit from oscillating at high frequency. Current to maintain V-8 in the center of its constant voltage discharge range is provided largely by resistors R-49, R-52 and R-53. This current is of the order of 23 milliamperes.

The anode of V-8 and the cathode of V-7 are connected to chassis or ground, which is the return for the output circuit connected to the cathode of V-5. As the load at output 1 or 2 draws current, the current through tube V-8 fluctuates by an equal amount. If a current of 15 milliamperes (full scale) flows through V-5 and through the load to chassis, that same current must flow through tube V-8, so that the total current through the latter tube is then 38 milliamperes. If a current of 15 milliamperes flows through the load from chassis to cathode of V-5 and then to B− through R-44 and R-43, that current must flow through R-49, R-52 and R-53, which current normally flows through the tube V-8. Hence the current through tube V-8 is then 23−15=8 milliamperes. It is evident, therefore, that the tube V-8 must regulate over a current range from about 5 to 40 milliamperes.

Resistors R-49, R-52 and R-53 also provide screen voltage for amplifier V-7, and a balancing voltage to reduce the effect of line voltage variations on the output voltage to zero or any other desired small positive or negative regulation value. If R-52 is decreased and R-49 is increased, the regulation becomes more negative, i. e. as the line voltage increases the B+ to B− voltage decreases. R-52 and R-49 should be so proportioned that minimum change in the system output occurs when a line voltage or load current change occurs.

The output of amplifier V-7 is developed across load R-51 and appears on the grid of tube V-6. In more conventional regulators, R-51 would be connected from the plate of V-7 to the cathode of V-6, rather than to the plate of the latter tube. The connection here utilized is preferred, as the amplifier tube V-7 operates at a much higher current, and hence at a much higher $g_m$ than in the usual system, and thus the regulation is better.

The heater supply for all of the tubes is a common secondary winding on transformer T, with one side of said winding connected to chassis or ground. As a result, most of the heaters are at nearly the same potential as their cathodes. The exceptions are V-4 where the cathode is approximately 90 volts below the heater, and V-6 where the cathode is 150 volts above the heater.

It was found to be unnecessary to regulate the heater currents for the oscillator or R. F. amplifiers, as the D. C. degeneration circuits maintain the plate current constant over a wide range of cathode temperatures.

By way of example in the circuit illustrated, the following tube types and values were used. The tubes were as follows:

V-1—6AU6        V-6—6Y6G
V-2—6AU6        V-7—6SJ7
V-3—6AU6        V-8—OC3/VR-105
V-4—6AT6        V-9—5Z4
V-5—6AQ5

The following resistance and capacitance values were used, the resistance values being given in ohms and the capacitance values being given in microfarads. The resistors were ½W. except where otherwise indicated.

R-1—10K          R-28—6.8K
R-2—12K          R-29—470
R-3—10K—10W      R-30—820
R-4—100          R-31—1.5K
R-5—47           R-32—2.7K
R-6—8.2          R-33—8.2K
R-7—10           R-34—180K
R-8—560          R-35—100K
R-9—1.2K         R-36—220K
R-10—15          R-37—4.7K
R-11—1.2K        R-38—470K
R-12—12K—1W      R-39—470K
R-13—1K          R-40—4.7K
R-14—1K          R-41—18K
R-15—4.7K        R-42—39K
R-16—8.2K        R-43—820—2W
R-17—4.7K        R-44—4K—10W
R-18—2.7K        R-45—1.5K—1W
R-19—1.5K        R-46—180K
R-20—2.2K        R-47—100K
R-21—4.7K        R-48—120K
R-22—1.2K        R-49—3.5K—10W
R-23—12K—1W      R-50—100
R-24—1K          R-51—560K
R-25—1K          R-52—10K—10W
R-26—3.3K        R-53—3.5K—10W
R-27—10K

C-1—.002         C-28—.0002
C-2—.0004        C-29—.001
C-3—.02          C-30—.001
C-4—.003         C-31—.01
C-5—.002         C-32—.001
C-12—.01         C-33—.1
C-13—.01         C-34—.1
C-14—.006        C-35—.002
C-15—.01         C-36—.1
C-20—.01         C-37—.01
C-21—.006        C-38—16
C-22—.01         C-39—16
C-23—.01         C-40—.01

It will be apparent to those skilled in the art that the system illustrated and described is capable of various circuit modifications. It is to be understood, therefore, that the invention contemplates any such changes or modifications as may be deemed desirable.

I claim:

1. In an electrical system for producing an output voltage representative of a variable condition, a tunable high frequency oscillator, a nearly balanced impedance bridge having its input coupled to said oscillator, said bridge comprising two tunable arms one of which includes a manually-adjustable reactance element variable by said condition, said bridge also including two inductance elements in the respective adjacent bridge arms, a high frequency vacuum tube amplifier having input circuit inductively coupled to said bridge through said inductance elements, a damping resistor for said input circuit, amplifying and detecting means coupled to the output of said amplifier to derive the aforementioned output voltage, a multi-position switch, and connections controlled by said switch to remove one of said inductance elements from the bridge circuit and to include said resistor in said input circuit when said switch is in one position, thereby enabling said oscillator to be tuned to bridge resonant frequency.

2. In an electrical system for producing an output voltage representative of a variable condition, a tunable high frequency oscillator, a nearly balanced impedance bridge having its input coupled to said oscillator, said bridge comprising two tunable arms one of which includes a manually-adjustable reactance element and the other of which includes a reactance element variable by said condition, said bridge also including two inductance elements in the respective adjacent bridge arms, a high frequency vacuum tube amplifier having its input inductively coupled to said bridge through said inductance elements, a resistor serially included in the input circuit of said amplifier, amplifying and detecting means coupled to the output of said amplifier to derive the aforementioned output voltage, a three-position switch, and connections controlled by said switch and effective in the different switch positions to establish the following conditions: (a) a normal condition in which said resistor is short-circuited, (b) a first alignment condition in which said resistor is included in circuit and one of said inductance elements is removed from the bridge circuit, and (c) a second alignment condition in which said resistor is short-circuited and the output of said oscilator is supplied directly to said amplifying means.

3. In an electrical system for producing an output voltage representative of a variable condition, a high frequency oscillator, a nearly balanced impedance bridge having its input coupled to said oscillator, said bridge including an element which is variable by said condition, a signal channel coupled to the output of said bridge, high frequency amplifying means included in said channel to amplify the output signal of said bridge, a detector tube coupled to said amplifying means to receive the amplified signal and to produce a direct voltage, direct-coupled amplifier means connected to said detector to derive an output voltage from said direct voltage, adjustable attenuator means included in said channel to control the sensitivity of the system, adjustable compensating means ganged with said attenuator means, and circuit means controlled by said compensating means to apply a compensating voltage to said detector tube so as to prevent change of the output voltage with adjustment of said attenuator means when a desired bridge unbalance obtains.

4. In an electrical system for producing an output voltage representative of a variable condition, a high frequency oscillator, a nearly balanced impedance bridge having its input coupled to said oscillator, said bridge including an element which is variable by said condition, a signal channel coupled to the output of said bridge, high frequency amplifying means included in said channel to amplify the output signal of said bridge, a diode detector coupled to said amplifying means to receive the amplified signal and to produce a direct voltage, direct-coupled amplifier means connected to said detector to derive an output voltage from said direct voltage, adjustable attenuator means included in said channel to control the sensitivity of the system, adjustable compensating means ganged with said attenuator means, and circuit means controlled by said compensating means to apply a compensating voltage to one of electrodes of said diode detector so as to prevent change of the output voltage with adjustment of said attenuator means when a desired bridge unbalance obtains.

5. In an electrical system for producing an output voltage representative of a variable condition, a high frequency oscillator, an impedance bridge having its input coupled to said oscillator, said bridge including an element which is variable by said condition, a signal channel coupled to the output of said bridge, said bridge adapted to be operated normally slightly off balance to give an output signal representative of variations of said condition in either direction from a reference, high frequency amplifying means included in said channel to amplify said signal, a detector coupled to said amplifying means to receive the amplified signal and to produce a direct voltage, direct-coupled amplifier means connected to said detector to derive an output voltage from said direct voltage, adjustable attenuator means included in said channel to control the sensitivity of the system, adjustable "resistance means ganged with said attenuator means, circuit means controlled by said adjustable resistance means to apply a compensating voltage to said detector tube so as to prevent change of the output voltage with adjustment of said attenuator means under desired conditions of bridge unbalance, and auxiliary adjustable resistance means interconnected with said first resistance means for varying the compensating voltage according to the extent of normal off-balance of said bridge.

6. In an electrical system for producing an output voltage representative of a variable condition, a high frequency oscillator, a nearly balanced impedance bridge having its input coupled to said oscillator, said bridge including an element which is variable by said condition, a signal channel coupled to the output of said bridge, high frequency amplifying means included in said channel to amplify the output signal of said bridge, a detector tube coupled to said amplifying means to receive the amplified signal and to produce a direct voltage, direct-coupled amplifier means connected to said detector to derive an output voltage from said direct voltage, an adjustable voltage divider connected in said channel and having a plurality of discrete adjustment positions to control the sensitivity of the system, adjustable resistance means ganged with said voltage divider and having a corresponding number of discrete adjustment positions, and circuit means controlled by said adjustable resistance means to apply a compensating voltage to one of the electrodes of said detector tube, so as to prevent change of the output voltage with adjustment of said voltage divider when a desired bridge unbalance obtains.

HOWARD E. TOMPKINS.

REFERENCES CITED

The following references are of record in the file of this patent:

UNITED STATES PATENTS

| Number | Name | Date |
|---|---|---|
| 2,040,341 | Schmierer | May 12, 1936 |
| 2,048,133 | McCullough | July 21, 1936 |
| 2,149,756 | Arenberg et al. | Mar. 7, 1939 |
| 2,357,023 | Reid et al. | Aug. 29, 1944 |
| 2,371,395 | Keeling | Mar. 13, 1945 |
| 2,485,863 | Chandler | Oct. 25, 1949 |
| 2,487,523 | Coake | Nov. 8, 1949 |
| 2,507,324 | Taborsky | May 9, 1950 |